United States Patent
Mori et al.

(10) Patent No.: US 7,989,521 B1
(45) Date of Patent: Aug. 2, 2011

(54) ANTIFOULING COATING COMPOSITION, ANTIFOULING COATING FILM FORMED USING THE COMPOSITION, COATED ARTICLE HAVING THE COATING FILM ON THE SURFACE, AND ANTIFOULING TREATMENT METHOD TO FORM THE COATING FILM

(75) Inventors: Kiyomi Mori, Osaka (JP); Hidenori Waku, Osaka (JP); Takayoshi Fujimoto, Osaka (JP); Satoshi Minamino, Osaka (JP)

(73) Assignee: Nitto Kasei Co., Ltd., Osaka (JP)

( * ) Notice: Subject to any disclaimer, the term of this patent is extended or adjusted under 35 U.S.C. 154(b) by 0 days.

(21) Appl. No.: 13/061,708

(22) PCT Filed: Dec. 17, 2009

(86) PCT No.: PCT/JP2009/071061
§ 371 (c)(1),
(2), (4) Date: Mar. 2, 2011

(87) PCT Pub. No.: WO2010/071181
PCT Pub. Date: Jun. 24, 2010

(30) Foreign Application Priority Data

Dec. 19, 2008 (JP) .................. 2008-324757

(51) Int. Cl.
*C08K 5/09* (2006.01)
*C08K 5/098* (2006.01)
*C09D 5/16* (2006.01)
*C08L 83/04* (2006.01)

(52) U.S. Cl. ........ 523/122; 523/177; 524/272; 524/301; 524/588; 428/447; 428/689; 106/15.05; 106/18.36

(58) Field of Classification Search ............. 523/122, 523/177; 524/272, 301, 588; 428/447, 689; 106/15.05, 18.36
See application file for complete search history.

(56) References Cited

U.S. PATENT DOCUMENTS

| | | | | |
|---|---|---|---|---|
| 2003/0139558 A1* | 7/2003 | Yamamori et al. | ............... | 528/25 |
| 2003/0207962 A1* | 11/2003 | Oya et al. | ............... | 523/177 |
| 2010/0209381 A1* | 8/2010 | Tanaka | ............... | 424/78.09 |

FOREIGN PATENT DOCUMENTS

| | | | |
|---|---|---|---|
| JP | 07-102193 | A | 4/1995 |
| JP | 08-269389 | A | 10/1996 |
| JP | 10-030071 | A | 2/1998 |
| JP | 10-265738 | A | 10/1998 |
| JP | 11-116857 | A | 4/1999 |
| JP | 2001-026621 | A | 1/2001 |
| JP | 2001-026729 | A | 1/2001 |
| JP | 2001-226440 | A | 8/2001 |
| JP | 2002-053796 | A | 2/2002 |
| JP | 2002-053797 | A | 2/2002 |
| JP | 2003-246962 | A | 9/2003 |
| JP | 2003-261816 | A | 9/2003 |
| JP | 2004-002819 | A | 1/2004 |
| JP | 2004-035881 | A | 2/2004 |
| JP | 2005-082725 | A | 3/2005 |
| JP | 2007-231290 | A | 9/2007 |
| JP | 2009-001619 | A | 1/2009 |
| WO | 2005/075581 | A1 | 8/2005 |
| WO | 2005-075581 | A1 | 11/2005 |
| WO | 2008/105122 | A1 | 9/2008 |

OTHER PUBLICATIONS

International Search Report for PCT/JP2009/071061: mailing date Feb. 2, 2010.

* cited by examiner

*Primary Examiner* — Kriellion Sanders
(74) *Attorney, Agent, or Firm* — Hsiu-Ming Saunders; Intellectual Property Connections, Inc.

(57) ABSTRACT

An object of the present invention is to provide a composition for forming an environment friendly antifouling coating film that is unlikely to cause a hairline crack and like coating film defects even when immersed in seawater for a long time, and that prevents or inhibits attachment of slime. An antifouling coating composition of the invention comprises: (A) a triorganosilyl ester-containing copolymer obtained by a mixture of (a) a triorganosilyl (meth)acrylate monomer represented by a general formula (1): $R^1$ is a hydrogen atom or a methyl, and $R^2$, $R^3$, and $R^4$ are equal or different each other, and each represent an alkyl group having 3 to 6 carbons and branched on α-position or a phenyl group, and (b) an ethylenically unsaturated monomer copolymerizable with the triorganosilyl (meth)acrylate monomer, (B) a modified rosin salt which is a salt of a modified rosin and zinc and/or copper, the modified rosin containing, in an amount of 80 weight % or more, two or more members selected from the group consisting of dihydroabietic acid, tetrahydroabietic acid, dehydroabietic acid, pimaric acid, isopimaric acid, and dihydropimaric acid.

7 Claims, No Drawings

ANTIFOULING COATING COMPOSITION, ANTIFOULING COATING FILM FORMED USING THE COMPOSITION, COATED ARTICLE HAVING THE COATING FILM ON THE SURFACE, AND ANTIFOULING TREATMENT METHOD TO FORM THE COATING FILM

REFERENCE TO RELATED APPLICATION

This application is a national stage application (under 35 U.S.C. 371) of PCT/JP2009/071061, filed Dec. 17, 2009, which claims the priority to Japan application Serial No. 2008-324757, filed Dec. 19, 2008, which is herein incorporated by reference in its entirety.

TECHNICAL FIELD

The invention relates to an antifouling coating composition, an antifouling coating film formed using the composition, a coated object having the coating film on its surface, and a method of antifouling treatment by formation of the coating film.

Conventionally, triorganosilyl group-containing copolymers which have low toxicity and are environment-friendly have been developed, and have been used for antifouling coating materials.

When copolymers, such as tri-n-butylsilyl ester-containing copolymers, which are obtained by copolymerizing silyl ester-containing monomers having straight-chain alkyl groups, are used, the hydrolysis rate of the coating film is very large and water resistance is low, and therefore, it is difficult to control the coating film dissolving rate. For this reason, copolymers obtained by copolymerizing triorganosilyl ester-containing monomers with branched alkyl groups such as isopropyl, t-butyl, etc. have been tried to be used (Patent Documents 1 to 7). However, when a coating compositions containing the copolymer is used, the coating film initially dissolves in seawater at a constant rate, but the dissolving rate of the coating film gradually increases, and becomes excessively high after a long period of time has elapsed, making the design of the coating material difficult.

For this reason, it has been tried to adjust the coating film dissolving rate by using the triorganosilyl ester-containing copolymer together with a resin acid, such as rosin (Patent Documents 8 to 12). However, gum rosin, wood rosin, tall oil rosin or like rosin has a free carboxylic acid and thus has high hydrophilicity. Therefore, it lowers the water resistance of the coating film, and thus tends to develop defects such as blisters, cracks, and the like.

Furthermore, it has been proposed to use the triorganosilyl ester-containing copolymer together with a rosin metal salt to obtain a coating composition. However, among rosin metal salts, sodium salt, calcium salt, and magnesium salt have high hydrophilicity, though their hydrophilicities are different from each other. Therefore, they tend to develop defects such as blisters, cracks, and the like.

In contrast, among rosin metal salts, rosin zinc salt and copper salt have relatively low hydrophilicity compared with the aforementioned sodium salt, etc., the aforementioned coating film defects can be effectively prevented. However, when an antifouling coating film formed using an antifouling coating material containing the zinc salt or the copper salt is immersed in seawater for a long time, it causes a hairline crack (microcrack) and like coating film defects, and as a result, the antifouling effect deteriorates. In addition, when the zinc salts or the copper salt is used, attachment of large fouling organisms of an animal system or a plant system can be prevented, but attachment of slime cannot be sufficiently prevented. When the slime accumulates on the antifouling coating film, the friction resistance of a ship increases, and the fuel consumption in sailing increases, for example.

Patent Document 1: JP-A-Hei 7 (1995)-102193
Patent Document 2: JP-A-Hei 8 (1996)-269389
Patent Document 3: JP-A-2001-26621
Patent Document 4: JP-A-2001-26729
Patent Document 5: JP-A-2001-226440
Patent Document 6: JP-A-2004-35881
Patent Document 7: JP-A-2005-082725
Patent Document 8: JP-A-Hei 10 (1998)-30071
Patent Document 9: JP-A-Hei 11 (1999)-116857
Patent Document 10: JP-A-2002-53796
Patent Document 11: JP-A-2002-53797
Patent Document 12: JP-A-2003-261816

DISCLOSURE OF THE INVENTION

Problem to be Solved by the Invention

An object of the present invention is to provide a composition for forming an environment friendly antifouling coating film that is unlikely to cause a hairline crack and like coating film defects even when immersed in seawater for a long time, and that prevents or inhibits attachment of slime.

The present inventors conducted extensive research to solve the above problem, and found that the above object can be achieved by using a composition having a specific modified rosin salt. The present invention has been accomplished based on this finding.

Specifically, the present invention provides the antifouling coating composition, the antifouling coating film formed by using the composition, the coated object having the coating film on its surface, and the method of antifouling treatment by formation of the coating film as described below.

1. An antifouling coating composition comprising:
(A) a triorganosilyl ester-containing copolymer obtained by a mixture of
(a) a triorganosilyl (meth)acrylate monomer represented by a general formula (1):

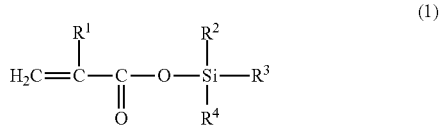

$R^1$ is a hydrogen atom or a methyl, and $R^2$, $R^3$, and $R^4$ are equal or different each other, and each represent an alkyl group having 3 to 6 carbons and branched on α-position or a phenyl group, and
(b) an ethylenically unsaturated monomer copolymerizable with the triorganosilyl (meth)acrylate monomer, and
(B) a modified rosin salt which is a salt of a modified rosin and zinc and/or copper, the modified rosin containing, in an amount of 80 weight % or more, two or more members selected from the group consisting of dihydroabietic acid, tetrahydroabietic acid, dehydroabietic acid, pimaric acid, isopimaric acid, and dihydropimaric acid.

2. The antifouling coating composition of the above item 1, wherein the amount of the two members selected from the group consisting of dihydroabietic acid, tetrahydroabietic acid, dehydroabietic acid, pimaric acid, isopimaric acid, and dihydropimaric acid is 85 to 100 weight %.
3. The antifouling coating composition of the above item 1 or 2, wherein a weight ratio defined by the triorganosilyl ester-containing copolymer (A)/the modified rosin salt (B) is 85/15 to 20/80.
4. The antifouling coating composition recited in any one of the items 1 to 3, wherein a weight ratio defined by the triorganosilyl ester-containing copolymer (A)/the modified rosin salt (B) is 70/30 to 40/60.
5. A method of antifouling treatment comprising the step of forming an antifouling coating film on the surface of an object to be coated using the antifouling coating composition recited in any one of the items 1 to 4.
6. An antifouling coating film formed using the antifouling coating composition recited in any one of the items 1 to 4.
7. A coated object having the antifouling coating film of the item 6 on the surface thereof.

Effect of the Invention

According to the antifouling coating composition of the invention, it is possible to form an antifouling coating film that is unlikely to cause a hairline crack and like coating film defects even when immersed in seawater for a long time, and that prevents or inhibits attachment of slime.

The composition of the invention hardly thickens, or gelates or solidifies even after a long period of storage. Furthermore, the antifouling coating composition of the invention is environment-friendly, and thus substantially free from marine pollution even if dissolved in seawater.

The antifouling coating film of the invention is advantageous in that:
1) It has excellent water resistance, and therefore cracking, peeling or the like is unlikely to occur and hairline cracking hardly occurs as well even if it is in contact with seawater for a long time; 2) It has a suitable hardness, and therefore cold flow or other defects is unlikely to occur in the resulting coating film; 3) It has a high adhesiveness to the object on which a coating film is formed; and 4) slime is hardly attached to the antifouling coating film even when it is immersed in seawater for a long time.

The coated object of the present invention is covered with the antifouling coating film having the characteristics of Items 1 to 4 described above. Therefore, it can be desirably applied to ships (in particular, ship bottoms), fishing tools, structures submerged in seawater, etc. For example, when the antifouling coating film is formed on the surface of a ship bottom, the antifouling coating film gradually dissolves from the surface, so that the coating film surface is always renewed. This prevents the adhesion of aquatic fouling organisms.

Furthermore, the antifouling coating film has a suitable solubility. Therefore, the ship can maintain the antifouling effect for a long time. In particular, even when the ship sails in a sea area having high water temperature, it can exhibit a long-term, antifouling effect, because the coating film dissolving rate is stable. In addition, even when the ships are not moving, for example, during anchorage, rigging, etc., it can exhibit a long-term, antifouling effect with little attachment or accumulation of aquatic fouling organisms (in particular, slime). This reduces the frictional resistance of the ships, and thus reduces the fuel cost while sailing.

Furthermore, the antifouling coating film on the surface is basically free from coating film defects even after a long period of time. For this reason, after using the coated object for a predetermined period, a new antifouling coating film can be desirably formed by directly recoating the antifouling coating film composition thereon. This makes it possible to continuously maintain the antifouling effect in a simple and inexpensive manner.

EMBODIMENT FOR CARRYING OUT THE INVENTION

<Antifouling Coating Composition>
An antifouling coating composition comprises:
(A) a triorganosilyl ester-containing copolymer obtained by a mixture of
(a) a triorganosilyl (meth)acrylate monomer represented by a general formula (1):

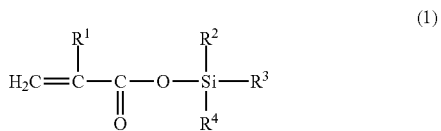

$R^1$ is a hydrogen atom or a methyl, and $R^2$, $R^3$, and $R^4$ are equal or different each other, and each represent an alkyl group having 3 to 6 carbons and branched on α-position or a phenyl group, and
(b) an ethylenically unsaturated monomer copolymerizable with the triorganosilyl (meth)acrylate monomer,
(B) a modified rosin salt which is a salt of a modified rosin and zinc and/or copper, the modified rosin containing, in an amount of 80 weight % or more, two or more members selected from the group consisting of dihydroabietic acid, tetrahydroabietic acid, dehydroabietic acid, pimaric acid, isopimaric acid, and dihydropimaric acid.

The antifouling coating composition of the invention can form an antifouling coating film which can inhibit or prevent attachment of aquatic fouling organisms (can effectively exhibit antifouling effect). In particular, the antifouling coating composition of the invention can form an antifouling coating film which prevent or inhibit attachment of slime by containing the modified rosin salt (B).

The aforementioned slime is different from shellfish, algae and like fouling organisms in that it is made of a membrane formed by a process that attached bacteria and diatom proliferate and agglomerate while secreting adhesive material to gradually form a large aggregate (colony). The slime may also be referred to as a primary microbial membrane. The slime is evaluated based on the thickness (amount) and strength of adherence. When the adherence of slime is strong, shellfish, algae and like fouling organisms tend to attach on the slime. When the thickness of slime is large, the friction of coating film surface increases, and as a result, the fuel consumption increases while sailing.

Furthermore, by using the modified rosin salt (B), it is possible to preferably form a coating film that is unlikely to cause a hairline crack and like coating film defects even when immersed in seawater for a long time, and maintains an antifouling effect for a long time. In addition, it is possible to preferably form a coating film that is insusceptible to influence of seawater temperature, and thus has stable coating film dissolving rate even in seawater having a high temperature. Furthermore, it is possible to preferably form a coating film that has suitable coating film hardness, and is excellent in strength and water resistance.

The antifouling coating compositions of the invention are excellent in storage stability, and will therefore hardly gelate or solidify even after a long period of storage.

<<Triorganosilyl Ester-Containing Copolymer (A)>>

An antifouling coating composition of the invention comprises:
(A) a triorganosilyl ester-containing copolymer obtained by a mixture of
(a) a triorganosilyl (meth)acrylate monomer represented by a general formula (1):

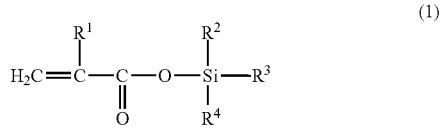

$R^1$ is a hydrogen atom or a methyl, and $R^2$, $R^3$, and $R^4$ are equal or different each other, and each represent an alkyl group having 3 to 6 carbons and branched on α-position or a phenyl group, and
(b) an ethylenically unsaturated monomer copolymerizable with the triorganosilyl (meth)acrylate monomer.

By containing the copolymer (A), it is possible to form an antifouling coating film which can effectively exhibit antifouling effect, and preferably prevent attachment of aquatic fouling organisms.

The glass-transition temperature (Tg) of the copolymer (A) is preferably about 30 to 80 deg. C. and is more preferably about 35 to 70 deg. C. When Tg is about 30 to 80 deg. C., coating film hardness is hardly dependent on water temperature or air temperature, and thus suitable hardness and strength can be maintained for a long time. Therefore, coating film defects such as cold flow, crack, peel-off, etc. are unlikely to occur.

The copolymer (A) has a weight-average molecular weight (Mw) of about 20,000 to 70,000, and preferably about 30,000 to 60,000. When Mw is about 20,000 to 70,000, physical properties (coating film hardness and strength) is preferable (crack or peel-off is unlikely to occur), a long-term, antifouling effect is properly exhibited.

One example of the method for the measurement of the Mw is gel permeation chromatography (GPC). When the Mw is measured by GPC, it is expressed as a value (a polystyrene-reduced value), obtained by conducting the measurement after preparing a calibration curve using polystyrene as a reference material.

The copolymer (A) is obtained by copolymerizing the monomer (a), the monomer (b). The copolymerization ratio of these monomers are usually proportional to the content ratio of the monomers in the mixture explained in the section "Synthesis of Triorganosilyl Ester-containing Copolymer (A)" below.

The copolymer (A) may be any copolymer of random copolymer, alternate copolymer, periodical copolymer, or block copolymer.

Hereinafter, methods of synthesizing the monomer (a), the monomer (b), the copolymer (A) are specifically explained.
Triorganosilyl (meth)acrylate Monomer (a)

Examples of the alkyl group having 3 to 6 carbons and branched on α-position include isopropyl, s-butyl, t-butyl, 1-ethylpropyl, 1-methylbutyl, 1-methylpentyl, 1,1-dimethylpropyl, 1,1-dimethylbutyl, thexyl, etc.

In particular, the invention enables formation of an antifouling coating film which is unlikely to cause coating film defects and excellent in water resistance by selecting specific groups as $R^2$, $R^3$, and $R^4$. From such an aspect, $R^2$, $R^3$, and $R^4$ are equal or different each other, and are each preferably isopropyl, s-butyl, t-butyl, and phenyl, and more preferably isopropyl, t-butyl, and phenyl.

Examples of the monomer (a) are triisopropylsilyl methacrylate, tri-s-butylsilyl methacrylate, triphenylsilyl methacrylate, diisopropyl-s-butylsilyl methacrylate, diisopropyl-t-butylsilyl methacrylate, diisopropylthexylsilyl methacrylate, diisopropylphenylsilyl methacrylate, isopropyl-di-s-butylsilyl methacrylate, isopropyl-diphenylsilyl methacrylate, diphenylthexlysilyl methacrylate, t-butyl-diphenylsilyl methacrylate, etc. In particular, from a viewpoint of forming an antifouling coating film which is unlikely to cause coating film defects and excellent in water resistance, triisopropylsilyl methacrylate, tri-s-butylsilyl methacrylate, and t-butyldiphenylsilyl methacrylate are preferred, and triisopropylsilyl methacrylate, and t-butyldiphenylsilyl methacrylate are more preferred. These triorganosilyl methacrylate monomers are each used singly or in combination.
Ethylenically Unsaturated Monomer (b)

The mixture may further contain another ethylenically unsaturated monomer (b) copolymerizable with the monomer (a).

Examples of the monomer (b) are methyl (meth)acrylate, ethyl (meth)acrylate, n-butyl (meth)acrylate, i-butyl (meth)acrylate, t-butyl (meth)acrylate, 2-ethylhexyl (meth)acrylate, lauryl (meth)acrylate, 2-methoxyethyl acrylate, 2-methoxypropyl acrylate, 4-methoxybutyl acrylate, 2-ethoxyethyl (meth)acrylate, ethylene glycol monomethyl (meth)acrylate, propylene glycol monomethyl (meth)acrylate, 2-hydroxyethyl (meth)acrylate, 2-hydroxypropyl (meth)acrylate, dimethylaminoethyl (meth)acrylate, diethylaminoethyl (meth)acrylate, benzyl (meth)acrylate, and phenyl (meth)acrylate and like (meth)acrylic ester; vinyl chloride, vinylidene chloride, (meth)acrylonitrile, vinyl acetate, butyl vinyl ether, lauryl vinyl ether, n-vinyl pyrrolidone and like vinyl compounds; styrene, vinyl toluene, α-methyl styrene and like aromatic compounds, etc. Among these, (meth)acrylic esters are preferred, methyl (meth)acrylate, ethyl (meth)acrylate, n-butyl (meth)acrylate, i-butyl (meth)acrylate, 2-ethylhexyl (meth)acrylate, and 2-methoxyethyl acrylate are more preferred. Examples of the monomer (b) may be used singly or in combination as monomer component of the copolymer (A).
Synthesis of Triorganosilyl Ester-containing Copolymer (A)

The copolymer (A) is obtained from the mixture of the monomer (a) and the monomer (b).

The content of the monomer (a) in the mixture is preferably about 45 to 65 weight %, and more preferably about 50 to 60 weight %. When the content of the monomer (a) is about 45 to 65 weight %, the coating film formed using the resultant antifouling coating composition can exhibit stable solubility, and it can maintain an antifouling effect for a long period of time.

The copolymer (A) is obtained by polymerizing the monomer (a) and the monomer (b) in the mixture. The polymerization is for example performed in the presence of a polymerization initiator.

Examples of the polymerization initiator include 2,2'-azobisisobutyronitrile (AIBN), 2,2'-azobis-2-methylbutyronitrile, dimethyl-2,2'-azobisisobutyrate and like azo compounds; benzoyl peroxide, di-tert-butyl peroxide, tert-butyl peroxybenzoate, tert-butyl peroxy isopropylcarbonate, t-butyl peroxy-2-ethyl hexanoate and like peroxide, etc. These polymerization initiators may be used singly or in combination. The polymerization initiator is especially preferred to be 2,2'-azobisisobutyronitrile, and t-butyl peroxy-2-ethyl hexanoate.

The molecular weight of the triorganosilyl ester-containing copolymer can be suitably adjusted by suitably selecting the amount of the polymerization initiator used.

Examples of polymerization methods include solution polymerization, bulk polymerization, emulsion polymerization, suspension polymerization, etc. Among these, solution polymerization is preferable, because it allows the copolymer (A) to be prepared easily and accurately.

In the polymerization reaction, an organic solvent may be added, if necessary. Examples of the organic solvent include xylene, toluene and like aromatic hydrocarbon-based solvents; hexane, heptane and like aliphatic hydrocarbon-based solvents; ethyl acetate, butyl acetate, isobutyl acetate, methoxypropyl acetate and like ester-based solvents; isopropyl alcohol, butyl alcohol and like alcohol-based solvents; dioxane, diethyl ether, dibutyl ether and like ether-based solvents; methyl ethyl ketone, methyl isobutyl ketone and like ketone-based solvents, etc. Among these, aromatic hydrocarbon-based solvents are preferable, and xylene is particularly preferable. These solvents may be used singly or in combination.

The reaction temperature in the polymerization reaction may be suitably selected depending on the type of the polymerization initiator, etc., but is usually about 70 to 140 deg. C., and preferably about 80 to 120 deg. C. The time necessary for the polymerization reaction may be suitably selected depending on the reaction temperature, etc., but is usually about 4 to 8 hours.

The polymerization reaction is preferably conducted in an inert gas (e.g. nitrogen gas and argon gas) atmosphere.

<<Modified Rosin Salt (B)>>

The antifouling coating composition of the invention contains a modified rosin salt which is a salt of a modified rosin and zinc and/or copper, the modified rosin containing, in an amount of 80 weight % or more, preferably 85 to 100 weight %, two or more members selected from the group consisting of dihydroabietic acid, tetrahydroabietic acid, dehydroabietic acid, pimaric acid, isopimaric acid, and dihydropimaric acid. By containing, in an amount of 80 weight % or more, two or more members selected from the group consisting of dihydroabietic acid, tetrahydroabietic acid, dehydroabietic acid, pimaric acid, isopimaric acid, and dihydropimaric acid, it is possible to form a coating film which prevents or inhibits attachment of slime. The reason that the attachment of the slime is prevented or inhibited may be the effect caused by the combination of the two members of the resin acids. Furthermore, it is possible to preferably form an antifouling coating film that is unlikely to cause a hairline crack and like coating film defects even when immersed in seawater for a long time, and maintain the antifouling effect for a long time.

When the amount of the two members selected from the group consisting of dihydroabietic acid, tetrahydroabietic acid, dehydroabietic acid, pimaric acid, isopimaric acid, and dihydropimaric acid is less than 80%, the attachment of the slime to the obtained antifouling coating film tends to increase, and thus the fuel consumption increases in long-term sailing. In addition, when the antifouling coating film is immersed in seawater for a long time, the antifouling coating film tends to develop a crack. The development of the crack can be somewhat suppressed by use of plasticizer, but the hairline crack (microcrack) is unavoidable. Once the hairline crack is generated, seawater is likely to penetrate into the coating film, and as a result, a crack or peel-off may occur. In addition, when the hairline crack exists on coating film surface, the coating film is likely to develop a crack or peel-off when the coating film is dried while the ship is on the dock. Furthermore, when the hairline crack is developed on coating film surface, the friction on coating film surface gradually increases. This is problematic in view of fuel consumption.

Conventionally, rosin, hydrogenated rosin, disproportionated rosin, etc. have been used as resin acids in the field of a ship bottom coating material. They are different from the modified rosin salt (B) in terms of the components.

For example, gum rosin, wood rosin or tall oil rosin and like rosins includes, in an amount of about 65 to 80 weight %, a resin acid having a highly-reactive conjugated diene structure on the abietane backbone, such as abietic acid, neoabietic acid, and palustric acid, and includes, in an amount of about 10 to 25 weight %, a resin acid not having a highly-reactive conjugated diene structure on the pimarane backbone, such as pimaric acid, isopimaric acid. Furthermore, hydrogenated rosin and disproportionated rosin include, in an amount of about 25 to 50 weight %, a resin acid having a highly-reactive conjugated diene structure on the abietane backbone, such as abietic acid, neoabietic acid, and palustric acid, and includes, in an amount of about 40 to 65 weight %, a resin acid not having a highly-reactive conjugated diene structure on the backbone.

In the present specification, a "modified rosin" means a modified product of rosin, and a product obtained by hydrogenation or disproportionation of rosin. A "modified rosin salt" means a product in which each component of the modified rosin forms a salt. In the present specification, a resin acid having a highly-reactive conjugated diene structure on the diterpene backbone such as the abietane backbone, etc. is referred to as a "conjugated dienoic resin acid," and a resin acid not having a highly-reactive conjugated diene structure on the diterpene backbone, such as the abietane backbone, the pimarane backbone, etc. is referred to as an "unconjugated dienoic resin acid." Here, because the conjugated dienoic resin acid includes a highly-reactive conjugated diene structure (conjugated double bond) on the diterpene backbone, it has a drawback that it is likely to deteriorate by oxidation. In contrast, the unconjugated dienoic resin acid does not include a highly-reactive conjugated diene structure on the diterpene backbone. Specifically, examples of the unconjugated dienoic resin acids include a resin acid having no double bond, a resin acid containing only one double bond, and a resin acid containing two unconjugated double bonds (not conjugated diene), and a resin acid containing double bonds which are stabilized by formation of a benzene ring. Thus, the unconjugated dienoic resin acid not having a highly-reactive conjugated diene structure on the diterpene backbone has lower reactivity compared with the conjugated dienoic resin acid, and thus is harder to deteriorate by oxidation.

The modified rosin forming the modified rosin salt (B) includes two or more members selected from the group consisting of dihydroabietic acid, tetrahydroabietic acid, dehydroabietic acid, pimaric acid, isopimaric acid, and dihydropimaric acid as unconjugated dienoic resin acids, and the total content of the unconjugated dienoic resin acids in the modified rosin is 80 mass % or more.

In particular, at least one member of the two or more kinds of the unconjugated dienoic resin acids in the modified rosin forming the modified rosin salt (B) is preferably selected from the group consisting of dihydroabietic acid, tetrahydroabietic acid, and dehydroabietic acid.

A zinc salt and/or a copper salt of the modified rosin stably exists in the coating material because these salts have high compatibility with the copolymer (A). Therefore, the composition of the present invention has excellent long-term storageability.

It is preferable that the modified rosin of the modified rosin salt (B) includes abietic acid, neoabietic acid, palustric acid and like conjugated dienoic resin acid in a as small amount as possible. Specifically, the content of the conjugated dienoic resin acid in the modified rosin is less than 20 weight %, and is preferred to be less than 10 weight %. When the content of the conjugated dienoic resin acid in the modified rosin is large, resistance to crack and slime of the antifouling coating film can be lowered.

The modified rosin salt (B) can be prepared, for example, by the method (I) or (II) below.

(I) Hydrogenation reaction of conjugated dienoic resin acids contained in the rosin is conducted in the presence of a metal catalyst, until the content of the unconjugated dienoic resin acids in the modified rosin becomes about 80 weight % or more. After that, the obtained modified rosin is reacted with a copper compound or a zinc compound.

By the hydrogenation reaction above, dihydroabietic acid, tetrahydroabietic acid, dihydropimaric acid, etc. are produced as unconjugated dienoic resin acids.

Examples of the metal catalyst include palladium, platinum, nickel, etc. The amount of the catalyst used may be suitably selected in consideration of the hydrogenation efficiency etc.

Examples of the rosin include gum rosin, wood rosin, tall oil rosin, etc. They may be used singly or in combination.

Hydrogen pressure is preferably about 0.1 to 20 MPa.

The reaction temperature in the hydrogenation reaction is usually room temperature (20 deg. C.) to about 300 deg. C.

The reaction time in the hydrogenation reaction may be suitably selected depending on the generation amount of the unconjugated dienoic resin acid.

The reaction between the obtained modified rosin and the copper compound or zinc compound may be conduced in accordance with a known method. For example, the reaction may be conducted by heating the modified rosin and the copper compound or zinc compound in a solvent at, for example, about 70 to 80 deg. C.

Examples of the copper compound include copper hydroxide, cuprous oxide, etc. They may be used singly or in combination.

Examples of the zinc compound include zinc oxide, zinc carbonate, etc. They may be used singly or in combination.

The amount of the copper compound and the zinc compound used is not, in particular, limited, and it may be selected so that all of the resin acids form copper salts or zinc salts.

The solvent is not, in particular, limited as long as it does not inhibit the reaction. Examples of the solvent include xylene, methanol, etc. They may be used singly or as a mixed solvent of the two or more kinds.

(II) Disproportionation reaction of rosin is conducted in the presence of catalyst until the amount of the unconjugated dienoic resin acid in the modified rosin becomes about 80 weight % or more. After that, the obtained modified rosin is reacted with a copper compound or a zinc compound.

By the disproportionation reaction above, dehydroabietic acid, dihydroabietic acid, pimaric acid, isopimaric acid, dihydropimaric acid, etc. are produced as unconjugated dienoic resin acids.

Examples of the catalyst include palladium carbon, nickel, iodine, etc. These may be used singly. They may be used in combination as long as the combination does not inhibit the reaction. The amount of the catalyst used may be suitably selected in consideration of the reaction efficiency etc.

Examples of the rosin shown in the above (I) may be used.

The disproportionation reaction is preferably conducted in an inert gas (nitrogen gas) atmosphere.

The reaction temperature in the disproportionation reaction is about 200 to 300 deg. C.

The reaction time in the disproportionation reaction may be suitably selected depending on the generation amount of the unconjugated dienoic resin acids.

The reaction between the obtained modified rosin and the copper compound or zinc compound may be conduced in accordance with a known method. For example, the reaction may be conducted by the method shown in the above (I).

The weight ratio defined by the copolymer (A)/the modified rosin (B) in the antifouling coating composition of the invention is preferably about 85/15 to 20/80, and more preferably about 70/30 to 40/60. When the weight ratio of the copolymer (A) and the modified rosin (B) about 85/15 to 20/80, the resultant antifouling coating film is insusceptible to seawater temperature, and exhibits stable coating film dissolving rate even in seawater having a high temperature. In addition, the antifouling coating film has suitable coating film hardness, and excellent strength and water resistance.

It is preferred that the composition of the present invention is substantially free from rosin and rosin derivatives that contain free carboxyl groups. Specifically, the content of the rosin and rosin derivative in the composition of the present invention is preferably about 1 or less weight %, and more preferably about 0 to 0.1 weight %. The rosin and rosin derivatives that contain free carboxyl groups have high hydrophilicity. Therefore, when the coating film contains such rosins and rosin derivatives, the water resistance of the coating film will be lowered, which may cause blisters, cracking and like defects on the coating film.

<<Cuprous Oxide>>

It is preferred that the antifouling coating composition of the present invention contains cuprous oxide. By containing the cuprous oxide, the resulting coating film can effectively exhibit the antifouling effect. The cuprous oxide can function as an antifoulant. There is no limitation to the form of the Cuprous oxide, as long as it does not adversely affect the effect of the invention. For example, the cuprous oxide may take a form of a particle.

The average particle diameter of the cuprous oxide is preferably about 3 to 30 µm. When the composition of the present invention contains the cuprous oxide having an average particle diameter of about 3 to 30 µm, the dissolving rate of the coating film can be desirably controlled so that a long-term antifouling effect can be exhibited.

A preferable example of the form of the cuprous oxide is a cuprous oxide whose surface is covered with a coating agent. For example, when a particulate cuprous oxide is used, it is preferable that the surface of each particle be covered with a coating agent. By covering with a coating agent, oxidation of the cuprous oxide can be desirably prevented.

Examples of the usable coating agents include stearic acid, lauric acid, glycerin, sucrose, lecithin, etc. These coating agents may be used singly or in combination.

It is preferable that the composition of the invention contains 100 to 450 parts by weight, and more preferably 200 to 400 parts by weight of cuprous oxide per total amount of 100 parts by weight of the copolymer (A) and the modified rosin salt (B). When the content of the cuprous oxide is 100 to 400 parts by weight per the total amount of 100 parts by weight, the coating film can exhibit an excellent antifouling effect.

The composition of the present invention may contain any inorganic antifoulant, in addition to the cuprous oxide, in such an amount that does not adversely affect the antifouling effect. Examples of usable inorganic antifoulants include copper thiocyanate (general name: copper rhodanide), cupronickel, copper powder, etc. These inorganic antifoulants may be used singly or in combination.

<<Organic Antifoulants>>

It is preferable that the antifouling coating composition of the present invention further contains organic antifoulant. There is no limitation to the organic antifoulants as long as they have a killing or repelling effect against aquatic fouling organisms. Examples of the organic antifoulants include 2-mercaptopyridine-N-oxide copper (general name: copper pyrithione) and like organic copper compounds; 2-mercaptopyridine-N-oxide zinc (general name: zinc pyrithione), zinc ethylene bis(dithio carbamate) (general name: zineb), zinc bis(dimethyldithiocarbamate) (general name: ziram), dizinc bis(dimethyldithiocarbamate)ethylenebis(dithiocarbamate) (general name: polycarbamate) and like organic zinc compounds; pyridine-triphenylborane, 4-isopropyl pyridyl-diphenylmethyl borane, 4-phenyl pyridiyl-diphenyl borane, triphenylboron-n-octadecyl amine, triphenyl[3-(2-ethylhexyloxy) propyl amine]boron and like organic boron compounds; 2,4,6-trichloromaleimide, N-(2,6-diethylphenyl)-2,3-dichloromaleimide and like maleimide compounds; and, 4,5-dichloro-2-n-octyl-3-isothiazolone (general name: Sea-Nine 211), 3,4-dichlorophenyl-N—N-dimethylurea (general name: diuron), 2-methylthio-4-t-butylamino-6-cyclopropylamino-s-triazine (general name: Irgarol 1051), 2,4,5,6-tetrachloroisophthalonitrile (general name: chlorothalonil), N-dichlorofluoromethylthio-N',N'-dimethyl-N-p-tolylsulfamide (general name: tolylfluanid), N-dichloromethylthio-N',N'-dimethyl-N-phenylsulfamide (general name: dichlofluanid), 2-(4-thiazolyl)benzimidazole (general name: thiabendazole), 3-(benzo[b]thien-2-yl)-5,6-dihydro-1,4,2-oxathiazine-4-oxide (general name: bethoxazine), 2-(p-chlorophenyl)-3-cyano-4-bromo-5-trifluoromethyl pyrrole (general name: Econea28), etc. Among these, zinc pyrithione, copper pyrithione, pyridine-triphenylborane, zineb, Sea-Nine 211, and Irgarol 1051 are preferred, and copper pyrithione, zinc pyrithione, pyridine-triphenylborane, and Sea-Nine 211 are more preferred. These organic antifoulants enhance the antifouling effect in combination with the above-mentioned cuprous oxide, and therefore even a little amount of the organic antifoulants works to maintain the antifouling effect in a sea area having active fouling organisms. These organic antifoulants may be used singly or in combination.

The content of the organic antifoulants in the composition of the present invention is preferably 1 to 50 parts by weight, and more preferably 10 to 30 parts by weight per total amount of 100 parts by weight of the copolymer (A) and the modified rosin salt (B). If the content of the organic antifoulants is less than one part by weight, the antifouling effect of the organic antifoulant cannot satisfactorily be exhibited. If the content exceeds 50 parts by weight, no improvement in the antifouling effect can be observed in proportion to the increase in the amount of the organic antifoulant; this is thus uneconomical.

<<Other Additives, Etc.>>

The antifouling coating composition of the present invention may further contain plasticizers, dewatering agents, dispersants, known pigments and like known additives.

By containing a plasticizer, the plasticity of the composition can be enhanced, allowing a desirably strong coating film to be obtained. Examples of the plasticizers include tricresyl phosphate, trioctylphosphate, triphenyl phosphate and like phosphate esters; dibutyl phthalate, dioctyl phthalate and like phthalate esters; dibutyl adipate, dioctyl adipate and like adipate esters; dibutyl sebacate, dioctyl sebacate and like sebacate esters; epoxidized soybean oil, epoxidized linseed oil and like epoxidized oils and fats; methyl vinyl ether polymer, ethyl vinyl ether polymer and like alkyl vinyl ether polymers; polyethylene glycol, polypropylene glycol and like polyalkylene glycols; and, t-nonylpentasulfide, vaseline, polybutene, tris(2-ethyl hexyl) trimellitate, silicone oil, liquid paraffin, chlorinated paraffin, polymeric plasticizers formed of ethylenically unsaturated carboxylate polymer, etc. Among these, tricresyl phosphate, epoxidized soybean oil, and epoxidized linseed oil are preferred. Epoxidized soybean oil and epoxidized linseed oil are especially preferred. By use of these plasticizers, physical properties of the coating film are improved, and in addition water resistance is enhanced. Therefore, penetration of seawater into the coating film is prevented, and thus crack, blister and like coating film defects can be prevented even in a sea area having a high seawater temperature. These plasticizer may be used singly or in combination.

The content of the plasticizer in the composition of the present invention depends on the content of the modified rosin salt (B), but is preferably 1 to 50 parts by weight, and more preferably 5 to 30 parts by weight per total amount of 100 parts by weight of the copolymer (A) and the modified rosin salt (B). If the content of the plasticizer is less than one part by weight, satisfactory improvement in the physical properties (strength and adhesiveness) cannot be obtained; if it exceeds 50 parts by weight, the coating film becomes too soft, and is practically unusable.

It is preferable that the antifouling coating composition of the present invention further contains a dewatering agent. The dewatering agent is an agent that removes water in the composition. Examples of usable dewatering agents include dehumidifiers and dehydrating agents. The dehumidifiers and the dehydrating agents may all be used singly, or both the dehumidifiers and the dehydrating agents may be used in combination.

The dehumidifier is a compound that can remove water in the coating composition by reacting with water. Examples of the dehumidifiers include methyl orthoformate, ethyl orthoformate and like alkyl orthoformates; tetraethoxysilane, tetrabutoxysilane, tetraphenoxysilane, tetrakis(2-ethoxybutoxy)silane, methyltrimethoxysilane, methyltriethoxysilane, dimethyldiethoxysilane, trimethylethoxysilane, diphenyldiethoxysilane and like alkoxysilanes; maleic anhydride, phthalic anhydride and like acid anhydrides, etc.

The dehydrating agent is a compound that can remove water in the composition by incorporating the water into the dehydrating agent as crystallization water. Examples of dehydrating agents include anhydrous gypsum, molecular sieves, magnesium sulfate, sodium sulfate, etc.

There is no limitation to the content of the dewatering agent in the composition of the present invention, but it is preferably 1 to 50 parts by weight, and more preferably 2 to 30 parts by weight per total amount of 100 parts by weight of the copolymer (A) and the modified rosin salt. When the content of the dewatering agent is about 1 to 50 parts by weight per the above-mentioned total amount of 100 parts by weight, the storage stability of the coating composition of the invention is further improved.

The antifouling coating composition of the present invention preferably further contains a dispersant (an antisettling agent). By containing a dispersant, sedimentation of the components (e.g., cuprous oxide mentioned above, pigments mentioned below) of the composition of the present invention, as well as the formation of a hard cake (a hard precipitate), can be prevented or inhibited during storage of the composition of the present invention. This also effectively solves the problem of dripping of the composition (the coating material) when a coating film is formed on the surface of an object to be coated by using the composition of the present invention.

Examples of dispersants include oxidized polyethylene-based dispersants, fatty acid amide-based dispersants, fatty acid ester-based dispersants, hydrogenated castor oil-based dispersants, vegetable polymerized oil-based dispersants, polyether ester-type surfactants, sulfate-type anionic surfactants, polycarboxylic acid amine salt-based dispersants, polycarboxylic acid-based dispersants, polymeric polyether-based dispersants, acrylic polymer-based dispersants, special silicon-based dispersants, talc-based dispersants, bentonite-based dispersants, kaolinite-based dispersants, silica gel-based dispersants, etc. These dispersants may be used singly or in combination. The composition of the present invention preferably contains a fatty acid amide-based dispersant. The composition of the present invention can be produced by, for example, preparing a mixed solution containing the copolymer (A) etc., and then mixing and dispersing the mixed solution. When the mixed solution contains the fatty acid amide-based dispersant, the storage stability of the mixed solution can be enhanced, and the composition of the present invention can be obtained more easily and reliably.

In the present invention, commercially available dispersants may be used. Examples of the fatty acid amide-based dispersants include Dispalon A603-10× (or 20×), Dispalon A630-10× (or 20×), Dispalon 6900-10× (or 20×), and Dispalon 6810-10× (or 20×) (all products of Kusumoto Chemicals, Ltd.); Talen 7500-20 and Flownon SP-1000 (both products of Kyoeisha Chemical Co., Ltd.); etc. Among these, Dispalon A603-10× (or 20×) is preferred. Because these dispersants do not include methanol, ethanol and like hydrophilic solvents, the storage stability of the antifouling coating composition can be more preferably maintained.

The dispersants may be used after being dispersed in a hydrophobic organic solvent, such as xylene.

There is no limitation to the content of the dispersant in the composition of the present invention; however, the content is preferably 1 to 50 parts by weight, and more preferably 2 to 30 parts by weight per total amount of 100 parts by weight of the copolymer (A) and the modified rosin salt (B). When the content of the dispersant is about 1 to 50 parts by weight per the above-mentioned total amount of 100 parts by weight, the effects of the dispersant (i.e., preventing the formation of a hard cake) is preferably exhibited, and the storage stability of the coating composition of the invention is further improved.

It is preferable that the antifouling coating composition of the present invention may further contain known pigments. Examples of the usable pigments include zinc oxide, red iron oxide, talc, titanium oxide, silica, bentonite, dolomite, calcium carbonate, barium sulfate and like inorganic pigments, and organic pigments of red color, blue color, etc. These pigments may be used singly or in combination. In particular, by containing the zinc oxice, it is possible to promote the dissolution of the coating film, and thus improve the renewability of the coating film.

There is no limitation to the content of the pigment in the composition of the present invention; however, the content is preferably 1 to 100 parts by weight, and more preferably 10 to 75 parts by weight per total amount of 100 parts by weight of the copolymer (A) and the modified rosin salt (B).

When the content of the zinc oxide is 20 or more parts by weight per the above-mentioned total amount of 100 parts by weight, penetration of seawater into the coating film is enhanced, there may occur a problem that dissolution control in a sea area having a high seawater temperature becomes difficult due to enhancement of the penetration of seawater into the coating film.

In addition, the antifouling coating composition of the invention may, if necessary, include dyes, anti-flooding agent, antifoaming agents and like common additives for coating material.

The composition of the present invention is usually dissolved or dispersed in an organic solvent. This makes the coating material desirably usable. Examples of the usable organic solvents include xylene, toluene, mineral spirit, MIBK, butyl acetate, etc. Among these, xylene and MIBK are particularly preferable. These organic solvents may be used singly or in combination.

<Method of Production of Antifouling Coating Composition>

The antifouling coating composition of the invention can be manufactured, for example, by mixing the copolymer (A), the modified rosin salt (B), and, if necessary, known additives such as the cuprous oxide, the plasticizer, etc. in a solvent.

The amounts of the copolymer (A), the modified rosin salt (B), etc. used may be suitably selected so that the resulting antifouling coating composition contains the modified rosin salt (B), etc., in acceptable content ranges as described in the section "Antifouling Coating Composition".

Examples of the usable solvents include xylene, toluene, mineral spirit, MIBK, butyl acetate, etc. Among these, xylene is particularly preferable. They may be used singly or in combination.

These components may be mixed in such a manner that the copolymer (A) and like various materials are dissolved or dispersed in a solvent. For example, the copolymer (A) and the modified rosin salt (B) may be dissolved or dispersed in a solvent first, and then mixed with other materials (such as organic antifoulants). As the solvent, the above-mentioned ones may be used.

Mixing may be conducted, for example, by a known disperser. The disperser may be desirably selected from those that can be used as micro-pulverizers. Specific Examples thereof include mills and dissolvers. Examples of the usable mills include ball mills, sand mills, bead mills, pearl mills, Dyno mills, Cowles mills, basket mills, attritors and like mills generally used for mixing and dispersing coating materials. A dissolver is a disperser having a rotary vane-type grinder. The mixed solution can be mixed and dispersed by rotating the grinder. The dissolver may also be called a disper.

When a cuprous oxide is contained, timing of adding the cuprous oxide and mixing conditions can be varied depending on the average particle diameter of the cuprous oxide.

Specifically, when a cuprous oxide having an average particle diameter of about 3 to 10 μm, preferably about 3 to 8 μm is used, it is preferable to mix the copolymer (A), the modified rosin salt (B), the cuprous oxide, and if necessary, known additives, and after that, to mix and disperse the resultant mixture by the disperser mentioned above.

The cuprous oxide having an average particle diameter of about 3 to 10 μm tends to form secondary aggregation. Therefore, when ingredients containing a cuprous oxide are mixed, the obtained composition is likely to have aggregation. This may cause cracking or the like in the resulting coating film. By mixing and dispersing a mixed solution that contains cuprous oxide having an average particle diameter of about 3 to 10 μm using a disperser, the secondary-aggregated cuprous oxide can be broken down. This makes it possible to obtain an antifouling coating composition with the cuprous oxide desirably dispersed therein.

When a dissolver is used as the disperser, it is preferable that the grinder of the dissolver be rotated at high speed. By making the grinder rotate at a high speed, the secondary-aggregated cuprous oxide can be desirably broken down.

When a cuprous oxide having an average particle diameter of about 10 to 20 µm, preferably about 13 to 20 µm is used as the cuprous oxide, it is preferable to mix the copolymer (A), the modified rosin salt (B), and if necessary, known additives, and after that, to add the cuprous oxide into the mixture.

When a cuprous oxide has an average particle diameter of about 10 to 20 µm, secondary aggregation is relatively unlikely to occur. For this reason, it is preferable to mix and disperse the copolymer (A) and the modified rosin salt (B) using a disperser, to add the cuprous oxide to the resultant mixture, and to mix the mixture using a mixer so as not to pulverize the cuprous oxide particles as much as possible. According to this method, the cuprous oxide is hardly pulverized, and therefore, the surface area of the cuprous oxide in the resulting composition becomes relatively small. For example, the specific surface area of the cuprous oxide can be as small as about $1.3 \times 10^{-3}$ mm$^2$ or less, preferably, about $3.0 \times 10^{-4}$ to $1.3 \times 10^{-3}$ mm$^2$. When the surface area of the cuprous oxide is small, the coating film dissolving rate can be effectively controlled even in seawater having high temperature. In addition, according to the method, processing time for the process by the disperser above can be shortened, reducing the production cost of the composition of the present invention.

When a dissolver is used as a disperser, it is preferable that the rotation speed of the grinder be set to medium or low. By setting the rotation speed of the grinder to medium or low, crushing of the cuprous oxide can be effectively prevented.

<Method of Antifouling Treatment, Antifouling Coating Film, and Coated Object>

The method of antifouling treatment of the invention are characterized in that an antifouling coating film is formed on the surface of the object to be coated using the above-explained antifouling coating composition. The method of antifouling treatment of the present invention can prevent adhesion of aquatic fouling organisms by the gradual dissolution of the surface of the antifouling coating film, so as to continually renew the surface of the coating film. また, After the dissolution of the coating film, the antifouling effect can be continuously exhibited by recoating the composition.

Examples of objects on which a coating film can be formed include ships (in particular, ship bottoms), fishing tools, structures submerged in seawater, etc. Examples of the fishing tools include fishing nets for use in aquaculture or in fixed netting, and fishing net accessories such as floats attached to fishing nets, ropes, etc. Examples of structures submerged in seawater include power plant aqueducts, bridges, port facilities, etc.

The antifouling coating film of the present invention can be formed by applying the antifouling coating composition to the surface (entirely or partially) of the object on which a coating film is formed.

Examples of the coating method include brush coating, spray coating, dipping, flow coating, spin coating, etc. These coating methods may be employed singly or in combination.

The coating composition is dried after application. The drying temperature may be room temperature. The drying time may be suitably selected depending on the thickness of the coating film, etc.

The thickness of the antifouling coating film may be suitably selected depending on the type of object on which a coating film is formed, the navigation speed of the ship, the seawater temperature, etc. For example, when the object on which a coating film is formed is a ship bottom, the thickness of the antifouling coating film is generally 50 to 500 µm, and preferably 100 to 400 µm.

The antifouling coating film of the invention is advantageous in that:
1) It has excellent water resistance, and therefore cracking, peeling or the like is unlikely to occur even if it is in contact with seawater for a long time; 2) It has a suitable hardness, and therefore cold flow or other defects is unlikely to occur in the resulting coating film; 3) It has a high adhesiveness to the object on which a coating film is formed; and 4) slime is hardly attached to the antifouling coating film even when it is immersed in seawater for a long time.

The coated object of the present invention has the antifouling coating film on its surface. The coated object of the present invention may have the antifouling coating film on the entire surface thereof, or a part thereof.

The coated object of the present invention is covered with the antifouling coating film having the characteristics of Items 1 to 4 described above. Therefore, it can be desirably applied to ships (in particular, ship bottoms), fishing tools, structures submerged in seawater, etc.

For example, when the antifouling coating film is formed on the surface of a ship bottom, the antifouling coating film gradually dissolves from the surface, so that the coating film surface is always renewed. This prevents the adhesion of aquatic fouling organisms.

Furthermore, the hydrolysis rate of the antifouling coating film in seawater is desirably controlled. Therefore, ships benefit from the antifouling effect for a long period of time; additionally, even when the ships are not moving, for example, during anchorage, rigging, etc., the adhesion and incrustation of aquatic fouling organisms is barely observed, and the antifouling effect is exhibited for a long time.

The surface of the antifouling coating film is basically free from cracking or peeling even after a long period of time. Therefore, it is unnecessary to completely removing the existing coating film before re-forming a new coating film. Therefore, by directly recoating the antifouling coating film composition thereon, the antifouling coating film can be effectively formed. This makes it possible to continuously maintain the antifouling effect easily and at low cost.

EXAMPLE

Features of the invention will be further clarified referring to the Examples, etc. shown below; however, the invention is not limited by the Examples.

In each of the production Examples, comparative production Examples, Examples, and comparative Examples, "%" denotes "% by weight". Viscosity was determined at 25 deg. C. using a Brookfield viscometer. The weight-average molecular weight (Mw) was determined by gel permeation chromatography (GPC) (using a polystyrene standard). GPC was performed under the following conditions.
Equipment: HLC-8220 GPC; Tosoh Corporation
Column: TSK-gel Super HZM-M (Tosoh Corporation). two
Flow rate: 0.35 mL/min
Detector: RI
Column thermostat temperature: 40 deg. C.
Eluate: THF The non-volatile content was determined by heating for 3 hours at 110 deg. C.

The amounts of each ingredient shown in Table 1 are represented in grams

Production Example 1

Production of Copolymer Solution A-1

230 g of xylene was charged to a 1,000 ml flask equipped with a thermometer, a reflux condenser, a stirrer, and a dropping funnel, after which a mixture of 270 g of triisopropylsilyl methacrylate, 50 g of methyl methacrylate, 130 g of 2-methoxyethyl methacrylate, 30 g of 2-methoxyethyl acrylate, 20 g of ethyl acrylate, and 4 g of t-butyl peroxy-2-ethyl hexanoate (initially added) was added dropwise into the flask over a period of 1 hour, while stirring at 100±2 deg. C. in a nitrogen atmosphere. After the dropwise addition, the polymerization reaction was performed for 2 hours at 100±2 deg. C. Then, while stirring the resulting reaction solution at 100±2 deg. C., 1 g of t-butyl peroxy-2-ethyl hexanoate (subsequently added) was added three times with 2-hour intervals to perform the polymerization reaction. After that, 270 g of xylene (additional solvent) was added and dissolved, thus producing the triorganosilyl ester-containing copolymer solution A-1. Table 1 shows the viscosity, non-volatile content, Mw, and Tg of A-1.

Production Examples 2 to 6

Production of Copolymer Solutions A2 to A6

Polymerization reactions were performed according to the same procedure as Production Example 1, using the organic solvent, monomers, and polymerization initiator shown in Table 1, thus producing the triorganosilyl ester-containing copolymer solutions A-2 to A6. Table 1 shows the viscosity, non-volatile content, Mw, and Tg of each copolymer solution obtained.

moved to a flask, and was concentrated under reduced pressure at 200 deg. C. to produce 475 g of a modified rosin (acid number 162 mgKOH/g). A part of the modified rosin was methylated by diazomethane, the componential analysis was conducted by gas chromatography (Column: diethylene glycol succinate (GEGS), 0.24 mmϕ×25 m, Column temperature: 200 deg. C., Carrier gas: nitrogen, Detector: Flame Ionization Detector (FID)). The amount of the unconjugated dienoic resin acids in the modified rosin was 87.8 weight % (dehydroabietic acid 62.8 weight %, dihydroabietic acid 15.2 weight %, dihydropimaric acid 9.8 weight %).

The obtained modified rosin was dissolved in xylene to obtain a xylene solution with a solid content of 50%. 400 g of the xylene solution was added to a flask, and 200 g of cuprous oxide was further added thereto so that all of the resin acids in the modified rosin forms copper salts, and thereafter 100 g of methanol wad added thereto, and uniformly mixed. After that, a suitable amount (about 400 ml) of glass beads (diameter: 2.5 to 3.5 mm) was added thereto, and the mixture was stirred for 8 hours at 70 to 80 deg. C. and then maintained for 2 days at 50 deg. C. The resulting mixture was cooled to room temperature (25 deg. C.) and filtered, and subsequently concentrated under reduced pressure to remove the methanol by distillation. Xylene was then added to the obtained concentrate, thus producing a xylene solution B-1 of a modified rosin copper salt containing a copper salt of the aforementioned unconjugated dienoic resin acid (a transparent dark blue solu-

TABLE 1

| Ingredient Class | | Ingredient Name | Production Example | | | | | |
|---|---|---|---|---|---|---|---|---|
| | | | 1 | 2 | 3 | 4 | 5 | 6 |
| Solvent In Initial Container | | Xylene | 230 | 230 | 230 | 230 | 230 | 230 |
| Triorganosilyl Group-Containing Monomer (a) | | Triisopropylsilyl Methacrylate | 270 | 300 | | | | 250 |
| | | Triisopropylsilyl Acrylate | | | 270 | 300 | | |
| | | T-Butyldiphenylsilyl Acrylate | | | | | 270 | |
| Ethylenically Unsaturated Monomer(b) | | Methyl Methacrylate | 50 | 50 | 130 | 130 | 130 | 150 |
| | | N-Butyl Methacrylate | | | | 20 | | |
| | | 2-Methoxyethyl Methacrylate | 130 | 100 | 50 | | 50 | 50 |
| | | Ethyl Acrylate | 20 | | | | | |
| | | N-Butyl Acrylate | | | 20 | 20 | 20 | 50 |
| | | 2-Methoxyethyl Acrylate | 30 | 30 | 30 | 30 | 30 | |
| Polymerization Initiator | Initially Added | T-Butyl Peroxy 2-Ethyl Hexanoate | 4 | 4 | 4 | 4 | 4 | 4 |
| | Subsequently Added 3 Times | T-Butyl Peroxy 2-Ethyl Hexanoate | 1 × 3 times | 1 × 3 times | 1 × 3 times | 1 × 3 times | 1 × 3 times | 1 × 3 times |
| Solvent Added After Completion Of Polymerization Reaction | | Xylene | 270 | 270 | 270 | 270 | 270 | 270 |
| | | Reaction Temperature (Deg. C.) | 100 ± 2 | 100 ± 2 | 100 ± 2 | 100 ± 2 | 100 ± 2 | 100 ± 2 |
| Copolymer | | Viscosity (mPa · S/25 Deg. C.) | 310 | 280 | 290 | 250 | 310 | 310 |
| | | Non-Volatile Content (%. 110 Deg. C. 3 Hrs) | 50.1 | 49.5 | 50.0 | 49.6 | 49.9 | 49.9 |
| | | Weight-Average Molecular Weight (Mw) | 46.000 | 42.000 | 47.000 | 45.000 | 47.000 | 47.000 |
| | | Glass Transition Temperature (Tg. Deg. C.) | 47 | 48 | 35 | 36 | 40 | 58 |
| | | Copolymer Name | A-1 | A-2 | A-3 | A-4 | A-5 | A-6 |

Production Examples 7

Production of Xylene Solution B-1 of Modified Rosin Copper Salt 500 g of Chinese gum rosin (WW) was added to a 1,000 ml flask equipped with a thermometer and a stirrer, and the temperature was increased to 180 deg. C. under a nitrogen gas flow. After that, 0.5 g of 5% palladium carbon wad added thereto, and while stirring the mixture, the mixture was reacted for 4 hours at 270±5 deg. C. After the reaction, the mixture was cooled to 200 deg. C., and the palladium carbon was removed by a pressure filtration, and the filtrate was tion; solid content: about 50%). The resulting xylene solution had a non-volatile content of 50.5%.

Production Example 8

Production of Xylene Solution B-2 of Modified Rosin Zinc Salt 400 g of a xylene solution of the modified rosin produced in Production Example 7 (solid content: 50%) was added to a 1,000 ml flask equipped with a thermometer, a reflux condenser, and a stirrer, and 100 g of zinc oxide was further added thereto so that all of the resin acids in the modified rosin forms zinc salts, and thereafter, the mixture was dehydrated through reflux at 70 to 80 deg. C. for 3 hours. After that, the mixture was cooled and filtrated to obtain a xylene solution B-2 of a modified rosin zinc salt containing a zinc salt of the aforementioned unconjugated dienoic resin acid (a transparent dark brown solution; solid content: about 50%). The resulting xylene solution had a non-volatile content of 50.9%.

Production Examples 9

Production of Xylene Solution B-3 of Modified Rosin Copper Salt 500 g of Chinese gum rosin (WW) and 1.0 g of 5% palladium carbon were added to a 3 L autoclave made of stainless-steel, and after oxygen gas in the system was removed, the system was pressurized by hydrogen gas to 50 kg/cm$^2$, and hydrogenation reaction was conducted for 4 hours while shaking at 270±5 deg. C. After the reaction, the mixture was cooled to 200 deg. C., and the palladium carbon was removed by a pressure filtration, and the filtrate was moved to a flask, and was concentrated under reduced pressure at 200 deg. C. to produce 482 g of a modified rosin (acid number 157 mgKOH/g). A part of the modified rosin was subjected to the componential analysis in the same way as Production Examples 7. The amount of the unconjugated dienoic resin acids in the modified rosin was 89.8 weight % (dihydroabietic acid 60.4 weight %, tetrahydroabietic acid 19.3 weight %, dihydropimaric acid 10.1 weight %).

The obtained modified rosin was dissolved in xylene to obtain a xylene solution with a solid content of 50%. 400 g of the xylene solution was added to a flask, and 200 g of cuprous oxide was further added thereto so that all of the resin acids in the modified rosin forms copper salts, and thereafter 100 g of methanol wad added thereto, and uniformly mixed. After that, a suitable amount (about 400 ml) of glass beads (diameter: 2.5 to 3.5 mm) wad added thereto, and the mixture was stirred for 8 hours at 70 to 80 deg. C. and then maintained for 2 days at 50 deg. C. The resulting mixture was cooled to room temperature (25 deg. C.) and filtered, and subsequently concentrated under reduced pressure to remove the methanol by distillation. Xylene was then added to the obtained concentrate, thus producing a xylene solution B-3 of a modified rosin copper salt containing a copper salt of the aforementioned unconjugated dienoic resin acid (a transparent dark blue solution; solid content: about 50%). The resulting xylene solution had a non-volatile content of 50.3%.

Production Example 10

Production of Xylene Solution B-4 of Modified Rosin Zinc Salt 400 g of a xylene solution of the modified rosin produced in Production Example 9 (solid content: 50%) was added to a 1,000 ml flask equipped with a thermometer, a reflux condenser, and a stirrer, and 100 g of zinc oxide was further added thereto so that all of the resin acids in the modified rosin forms zinc salts, and thereafter, the mixture was dehydrated through reflux at 70 to 80 deg. C. for 3 hours. After that, the mixture was cooled and filtrated to obtain a xylene solution B-4 of a modified rosin zinc salt containing a zinc salt of the aforementioned unconjugated dienoic resin acid (a transparent dark brown solution; solid content: about 50%). The resulting xylene solution had a non-volatile content of 50.6%.

Comparative Production Examples 1

Production of Xylene Solution R-1 of Resin Acid Copper Salt 400 g of a xylene solution of Chinese gum rosin (WW, unconjugated dienoic resin acid 15.5 weight %, conjugated dienoic resin acid 72.4 weight %) (solid content: 50%) was added to a 1,000 ml flask equipped with a thermometer, a reflux condenser, and a stirrer. 200 g of cuprous oxide was further added thereto so that all of the resin acids in the gum rosin forms copper salts, and thereafter 100 g of methanol wad added thereto, and uniformly mixed. After that, a suitable amount (about 400 ml) of glass beads (diameter: 2.5 to 3.5 mm) wad added thereto, and the mixture was stirred for 8 hours at 70 to 80 deg. C. and then maintained for 2 days at 50 deg. C. The resulting mixture was cooled to room temperature (25 deg. C.) and filtered, and subsequently concentrated under reduced pressure to remove the methanol by distillation. Xylene was then added to the obtained concentrate, thus producing a xylene solution R-1 containing a copper salt of the aforementioned unconjugated dienoic resin acid (a transparent dark blue solution; solid content: about 50%). The resulting xylene solution of the resin acid copper salt had a non-volatile content of 50.7%.

Comparative Production Examples 2

Production of Xylene Solution R-2 of Resin Acid Zinc Salt 400 g of a xylene solution of Chinese gum rosin (WW, unconjugated dienoic resin acid 15.5 weight %, conjugated dienoic resin acid 72.4 weight %) (solid content: 50%) was added to a 1,000 ml flask equipped with a thermometer, a reflux condenser, and a stirrer, and 100 g of zinc oxide was further added thereto so that all of the resin acids in the gum rosin forms zinc salts, and thereafter, the mixture was dehydrated through reflux at 70 to 80 deg. C. for 3 hours. After that, the mixture was cooled and filtrated to obtain a xylene solution R-2 containing a zinc salt of the aforementioned unconjugated dienoic resin acid (a transparent dark brown solution; solid content: about 50%). The resulting xylene solution of the resin acid zinc salt had a non-volatile content of 50.5%.

Comparative Production Examples 3

Production of Xylene Solution R-3 of Resin Acid Copper Salt 500 g of Chinese gum rosin (WW) was added to a 1,000 ml flask equipped with a thermometer and a stirrer, and the temperature was increased to 180 deg. C. under a nitrogen gas flow. After that, 0.5 g of 5% palladium carbon wad added thereto, and while stirring the mixture, the mixture was reacted for 1 hours at 230±5 deg. C. After the reaction, the mixture was cooled to 200 deg. C., and the palladium carbon was removed by a pressure filtration, and the filtrate was moved to a flask, and was concentrated under reduced pressure at 200 deg. C. to produce 480 g of a resin acid (acid number 169 mgKOH/g). A part of the resin acid was subjected to the componential analysis in the same way as Production Examples 7. The amount of the unconjugated dienoic resin acids in the resin acid was 47.3 weight % (dehydroabietic acid 35.5 weight %, dihydroabietic acid 5.3 weight %, dihydropimaric acid 6.5 weight %).

The obtained resin acid was dissolved in xylene to obtain a xylene solution with a solid content of 50%. 400 g of the xylene solution was added to a flask, and 200 g of cuprous oxide was further added thereto so that all of the resin acids forms copper salts, and thereafter 100 g of methanol was added thereto, and uniformly mixed. After that, a suitable amount (about 400 ml) of glass beads (diameter: 2.5 to 3.5 mm) wad added thereto, and the mixture was stirred for 8 hours at 70 to 80 deg. C. and then maintained for 2 days at 50 deg. C. The resulting mixture was cooled to room temperature (25 deg. C.) and filtered, and subsequently concentrated under reduced pressure to remove the methanol by distillation. Xylene was then added to the obtained concentrate, thus producing a xylene solution R-3 containing a copper salt of the aforementioned unconjugated dienoic resin acid (a transparent dark blue solution; solid content: about 50%). The resulting xylene solution had a non-volatile content of 51.2%.

Comparative Production Examples 4

Production of Xylene Solution R-4 of Resin Acid Zinc Salt 400 g of a xylene solution of the resin acid produced in Comparative Production Examples 3 (solid content: 50%) was added to a 1,000 ml flask equipped with a thermometer, a reflux condenser, and a stirrer, and 100 g of zinc oxide was further added thereto so that all of the resin acids in the modified rosin forms zinc salts, and thereafter, the mixture was dehydrated through reflux at 70 to 80 deg. C. for 3 hours. After that, the mixture was cooled and filtrated to obtain a xylene solution R-4 containing a zinc salt of the aforementioned unconjugated dienoic resin acid (a transparent dark brown solution; solid content: about 50%). The resulting xylene solution had a non-volatile content of 50.9%.

Examples 1 to 7 and Comparative Examples 1 to 5

Production of Coating Compositions

Components listed in Table 2 were blended in the proportions (weight %) shown in Table 2, and were mixed and dispersed together with glass beads with a diameter of 1.5 to 2.5 mm to produce coating compositions.

TABLE 2

| | Ingredient Name | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|---|
| Copolymer | A-1 | 15 | | | | 10 | | | 15 | | 15 | | |
| | A-2 | | 15 | | | | | | | 15 | | 15 | |
| | A-3 | | | 15 | | | | | | | | | |
| | A-4 | | | | 15 | | | | | | | | |
| | A-5 | | | | | | 10 | | | | | | |
| | A-6 | | | | | | | 20 | | | | | 10 |
| Modified Rosin Salt Solution, Resin Acid Salt Solution, Rosin Solution | B-1 | 10 | | | | 15 | | | | | | | |
| | B-2 | | 10 | | | | 15 | | | | | | |
| | B-3 | | | 15 | | | | | | | | | |
| | B-4 | | | | 15 | | | 20 | | | | | |
| | R-1 | | | | | | | | 10 | | | | |
| | R-2 | | | | | | | | | 10 | | | |
| | R-3 | | | | | | | | | | 10 | | |
| | R-4 | | | | | | | | | | | 10 | |
| | Gum Rosin Solution (Solid Content: About 50%, Xylene Solution) | | | | | | | | | | | | 15 |
| Antifoulant | Cuprous Oxide (Nissin Chemco, Ltd., NC-301, Average Particle Diameter 3 μm) | 45 | 45 | 45 | 45 | 45 | 45 | | 45 | 45 | 45 | 45 | 45 |
| | Copper Pyrithione (Arch Chemicals, Inc. Copper Omadine) | 3 | 3 | 3 | 3 | | 3 | | 3 | 3 | 3 | 3 | |
| | Sea-Nine 211 (Rohm And Haas Company, Effective Component 30%, Xylene Solution) | | | | | 10 | | 10 | | | | | 10 |
| | Pyridine-Triphenylborane (Hokko Chemical Industry Co., Ltd., PK) | | | | | | | 7 | | | | | |
| Pigment | Red Iron Oxide (Toda Pigment Corp., Toda Color EP-13D) | 3 | 3 | 3 | 3 | 3 | 3 | 3 | 3 | 3 | 3 | 3 | 3 |
| | Talc (Matsumura Industries Co., Ltd., Crown Talc 3S) | 2 | 2 | 2 | 2 | 2 | 2 | 12 | 2 | 2 | 2 | 2 | 2 |
| | Mica (Wakimoto Mica Co. Ltd., Mica Shiratama) | 2 | 2 | 2 | 2 | 2 | 2 | 2 | 2 | 2 | 2 | 2 | 2 |
| | Zinc Oxide (Seido Chemical Industry Co., Ltd., Zinc Oxide Second (Trade Name)) | 2 | 2 | 2 | 2 | 2 | 2 | 15 | 2 | 2 | 2 | 2 | 2 |
| | Titanium Oxide (Furukawa Co., Ltd., FR-41) | 1 | 1 | 1 | 1 | 1 | 1 | | 1 | 1 | 1 | 1 | 1 |
| | Organic Red Color Pigment (Sanyo Color Works. Ltd., Scarlet TR) | 1 | 1 | 1 | 1 | 1 | 1 | 1 | 1 | 1 | 1 | 1 | 1 |
| Other Adiditves | Tetraethoxysilane (Kishida Chemical Co., Ltd., Special Grade) | 1 | 1 | 1 | 1 | 1 | 1 | | | | | | |
| | Molecular Sieves 4A (Union Showa K.K., Synthetic Zeolite Powder) | | | | | | | 1 | 1 | 1 | 1 | 1 | 1 |
| | Dispalona 603-20x (Kusumoto Chemicals, Ltd., Fatty Acid Amide-based Thixotropic Agent. Effective Component 30%, Xylene Paste) | 3 | 3 | 3 | 3 | 3 | 3 | 3 | 3 | 3 | 3 | 3 | 3 |
| Solven | Xylene | 12 | 12 | 7 | 7 | 5 | 12 | 6 | 12 | 12 | 12 | 12 | 5 |
| | Total | 100 | 100 | 100 | 100 | 100 | 100 | 100 | 100 | 100 | 100 | 100 | 100 |

Test Example 1

Stability Test for Coating Compositions

Each of the coating compositions obtained in Examples 1 to 7 and Comparative Examples 1 to 5 was sealed in a 100 ml wide-mouth tin can and stored in an incubator at 40 deg. C. for 1 month, after which the viscosity of the coating composition was measured using a Brookfield viscometer.

The viscosity of the coating composition was evaluated as follows.
A: a change in viscosity of less than 500 mPa·s/25 deg. C. (substantially no change in the coating composition)
B: a change in viscosity of 500 to 5,000 mPa·s/25 deg. C. (a slight increase in viscosity)
C: a change in viscosity of more than 5,000 and up to 100,000 mPa·s/25 deg. C. (a significant increase in viscosity)
D: a change so significant that the viscosity was unmeasurable (the coating composition turned into a gel or solidified)
The results are shown in Table 3.

It can be seen from Table 3 that the coating material formed using the coating composition of the invention (Examples 1 to 7) is excellent in storage stability.

Test Example 2

Coating Film Hardness

Each of the antifouling coating compositions obtained in Examples 1 to 7 and Comparative Examples 1 to 5 was applied to a transparent glass plate (75×150×1 mm) so that the dry coating film thickness would be about 100 μm, and dried for 1 day at 40 deg. C. The coating film hardness of the resulting dry coating film was measured at 25 deg. C. using a pendulum hardness tester. The results (count number) are shown in Table 3. A count number of 20 to 50 is preferable for practical purposes.

It can be seen from Table 3 that the coating films formed using the coating compositions of the invention (Ex. 1-7) have a suitable hardness.

Test Example 3

Adhesion Test for Coating Films

The adhesion of each coating film was tested in accordance with JIS K-5600-5-6. Specifically, tests were conducted according to the following method. Each of the coating compositions obtained in Examples 1 to 7 and Comparative Examples 1 to 5 was first applied to a tin plate (75×150×2 mm) so that the dry coating film thickness would be about 100 μm. The applied coating was then dried for 1 day at 40 deg. C. to prepare a dry coating film with a thickness of about 100 μm. After that, the adhesion test was conducted.

The evaluation was conducted in the following way.
(1) Evaluation Before Tape Treatment
Horizontal eleven lines are vertical eleven lines are formed on the dried coating film with a cutter so as to reach the base (the tin plate) and to form a crosshatch having 100 squares (each 2×2 mm). The adhesion state of the coating film in the crosshatch was visually inspected.
A: the number of the squares that did not peel off is from 70 to 100.
B: the number of the squares that did not peel off is from 40 to 69.
C: the number of the squares that did not peel off is from 20 to 39.
D: the number of the squares that did not peel off is from 0 to 19.
(2) Evaluation after tape treatment
After the evaluation of the above (1), a cellophane tape (Nichiban Co., Ltd. tape width 24 mm) was affixed to the above-mentioned 100 squares, and one end of the tape was held, and the tape was peeled-off quickly. After that, the adhesion state of the coating film was visually inspected.
A: the number of the squares that did not peel off is from 70 to 100.
B: the number of the squares that did not peel off is from 40 to 69.
C: the number of the squares that did not peel off is from 20 to 39.
D: the number of the squares that did not peel off is from 0 to 19.
The results are shown in Table 3.

It can be seen from Table 3 that the coating films formed using the coating compositions of the invention (Ex. 1-7) strongly adhere to the tin plate.

Test Example 4

Flexibility Test for Coating Films

Each of the coating compositions obtained in Examples 1 to 7 and Comparative Examples 1 to 5 was applied to a blast-finished tin plate (75×150×2 mm) so that the dry coating film thickness would be about 100 μm. The applied coating was then dried for 1 day at 40 deg. C. to prepare a dry coating film with a thickness of about 100 μm. The tin plate coated with the dry coating film was bent 90 deg., and the condition of the bent coating film was visually inspected.

The flexibility was evaluated as follows.
A: substantially free of cracks
B: contained minute cracks
C: contained large cracks
D: a portion of the coating film was easily peeled-off
The results are shown in Table 3.

TABLE 3

| | | Coating Material Stability 40 Deg. C. After 1 Month | Coating Film Hardness Count Number (Pendulum) | Adhesion Test Before Tape Treatment | Adhesion Test After Tape Treatment | Flexibility Test |
|---|---|---|---|---|---|---|
| Ex. | 1 | A | 38 | A | A | A |
| | 2 | A | 31 | A | A | A |
| | 3 | A | 44 | A | A | A |
| | 4 | A | 34 | A | A | A |
| | 5 | A | 24 | A | A | A |

TABLE 3-continued

|  |  | Coating Material Stability 40 Deg. C. After 1 Month | Coating Film Hardness Count Number (Pendulum) | Adhesion Test Before Tape Treatment | Adhesion Test After Tape Treatment | Flexibility Test |
|---|---|---|---|---|---|---|
|  | 6 | A | 37 | A | A | A |
|  | 7 | A | 28 | A | A | A |
| Comp. Ex. | 1 | A | 35 | C | C | C |
|  | 2 | A | 30 | D | D | D |
|  | 3 | A | 38 | C | C | C |
|  | 4 | B | 34 | C | C | C |
|  | 5 | D | 22 | A | A | A |

Test Example 5

Rotary Test

A tank was provided, in the center thereof, with a rotating drum with a diameter of 515 mm and a height of 440 mm to allow the rotation of the drum via a motor. The tank was also provided with a cooling apparatus for keeping the seawater temperature constant, and a pH automatic controller for keeping the pH of the seawater constant.

Two test plates were prepared for each coating composition according to the following method.

An anti-corrosive coating film was formed by applying an anti-corrosive coating material (a vinyl-based A/C) to a hard vinyl chloride plate (75×150×1 mm) so that the thickness after drying would be about 50 μm, followed by drying. Each of the antifouling coating compositions obtained in Examples 1 to 7 and Comparative Examples 1 to 5 was applied to the anti-corrosive coating film so that the thickness after drying would be about 300 μm. The applied coating was dried for 3 days at 40 deg. C., thus preparing a test plate having a dry coating film with a thickness of about 300 μm.

One of the thus-prepared test plates was secured to the rotating drum of the rotary apparatus of the above-mentioned equipment to contact the seawater, and the rotating drum was rotated at a speed of 20 knots. During the test, the seawater temperature was maintained at 25 deg. C. and the pH at 8.0 to 8.2; the seawater was replaced once every week.

The initial coating film thickness and the remaining coating film thickness after every 3 months from the beginning of the test were measured for each test plate, using a laser focus displacement meter, and the thickness of the dissolved coating film was calculated from the difference therebetween to give the dissolving amount of the coating film per month (μm/month). The measurement was conducted for 24 months, and the coating film dissolving amount was calculated every 12 months.

After the rotary test was completed (after 24 months), the test plate was dried, and the surface of the coating film was visually inspected to evaluate the state of the coating film.

The evaluation was conducted in the following way.

A: No defects is observed

B: Hairline cracks are slightly observed

C: Hairline cracks are observed on the entire surface of the coating film

D: Coating film defects such as large cracks, blisters or peel-offs are observed The results are shown in Table 4.

TABLE 4

|  |  | Coating Film Dissolving Amount and State In Rotary Test | | |
|---|---|---|---|---|
|  |  | Average Coating Film Dissolving Amount From Beginning to 12 Months (μm/Month) | Average Coating Film Dissolving Amount From 12 Months to 24 Months (μm/Month) | Coating Film State After 24 Months |
| Ex. | 1 | 3.5 | 3.7 | A |
|  | 2 | 4.9 | 4.5 | A |
|  | 3 | 3.8 | 4.2 | A |
|  | 4 | 4.5 | 4.0 | A |
|  | 5 | 3.5 | 3.7 | A |
|  | 6 | 3.0 | 3.2 | A |
|  | 7 | 2.8 | 3.1 | A |
| Comp. Ex. | 1 | 3.7 | 3.9 | D |
|  | 2 | 4.8 | 4.5 | D |
|  | 3 | 3.5 | 3.6 | C |
|  | 4 | 4.6 | 4.3 | C |
|  | 5 | 9.6 | 8.8 | D |

It can be seen from Table 4 that the coating films formed using the coating composition of the invention (Examples 1 to 7) are dissolved in seawater in an amount of about 2 to 5 μm per month (annual average). In addition, the coating films formed using the coating compositions of the invention exhibit certain reductions in the dissolving rate, so that they are dissolved stably for an extended period of time. Furthermore, the coating films formed using the coating compositions of the invention are excellent in water resistance, and do not develop cracks or hairline cracks, and thus the antifouling effect can be maintained for a long time.

In contrast, the coating films formed using the coating composition of Comparative Examples 1, 2, and 5 have low water resistance, and thus develop cracks or peel-offs during the test. Furthermore, the coating films formed using the coating composition of Comparative Examples 3 and 4 are preferable in water resistance, but develop hairline cracks (microcracks) after the long-term use. Furthermore, the coating film formed using the coating composition of Comparative Example 5 has too large dissolving rate in seawater, and thus cannot exhibit the antifouling effect for a long time.

Test Example 6

Antifouling Test

Each of the coating compositions obtained in Examples 1 to 7 and Comparative Examples 1 to 5 was applied to both surfaces of a hard vinyl chloride plate (100×200×2 mm) so that the dry coating film thickness would be about 200 μm.

The applied coating was dried for 3 days at room temperature (25 deg. C.), thus preparing a test plate having a dry coating film with a thickness of about 200 μm. This test plate was immersed at 1.5 m below sea level in Owase City, Mie Prefecture, Japan, and fouling of the test plate was examined for 24 months.

The evaluation was conducted by visual inspection of the state of the surface of the coating film in accordance with criteria shown below.

A: Fouling organisms such as shellfish or algae are not attached, and slime is hardly attached.
B: Fouling organisms such as shellfish or algae are not attached, and slime is thinly attached (to the extent that the coating film surface is observable) and the slime can be removed when wiped by brush softly.
C: Fouling organisms such as shellfish or algae are not attached, and slime is thinly attached (to the extent that the coating film surface is observable) and the slime cannot be removed even when wiped by brush strongly.
D: Fouling organisms such as shellfish or algae are not attached, and slime is thickly attached (to the extent that the coating film surface is not observable) and the slime cannot be removed even when wiped by brush strongly.
E: Fouling organisms such as shellfish or algae are attached The results are shown in Table 5.

It can be seen from Table 5 that fouling organisms such as shellfish or algae are not attached and slime is hardly attached to the coating films formed using the coating composition of the invention (Examples 1 to 7).

In contrast, after 12-month immersion, slime is attached to the coating films formed using the coating compositions of Comparative Examples 1 to 5. Furthermore, fouling organisms such as shellfish or algae are attached, after 24-month immersion to the slime on the coating film formed using the coating composition of Comparative Example 5.

TABLE 5

|  |  | Evaluation | |
|---|---|---|---|
|  |  | After 12 Months | After 24 Months |
| Ex. | 1 | A | A |
|  | 2 | A | A |
|  | 3 | A | A |
|  | 4 | A | A |
|  | 5 | A | A |
|  | 6 | A | A |
|  | 7 | A | A |
| Comp. Ex. | 1 | D | D |
|  | 2 | D | D |
|  | 3 | C | D |
|  | 4 | C | D |
|  | 5 | D | E |

The invention claimed is:

1. An antifouling coating composition comprising:
(A) a triorganosilyl ester-containing copolymer obtained from a mixture of
(a) a triorganosilyl (meth)acrylate monomer represented by a general formula (1):

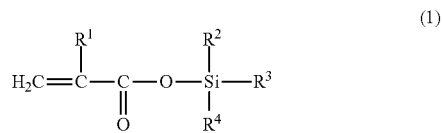

$R^1$ is a hydrogen atom or a methyl, and $R^2$, $R^3$, and $R^4$ are equal or different from each other, and each represents an alkyl group or a phenyl group, wherein the alkyl group has 3 to 6 carbons and the alpha carbon thereof is branched; and
(b) an ethylenically unsaturated monomer copolymerizable with the triorganosilyl (meth)acrylate monomer; and
(B) a modified rosin salt which is a salt of a modified rosin and zinc and/or copper, the modified rosin containing, in an amount of 80 weight % or more, two or more members selected from the group consisting of dihydroabietic acid, tetrahydroabietic acid, dehydroabietic acid, pimaric acid, isopimaric acid, and dihydropimaric acid.

2. The antifouling coating composition of claim 1, wherein the amount of the two members selected from the group consisting of dihydroabietic acid, tetrahydroabietic acid, dehydroabietic acid, pimaric acid, isopimaric acid, and dihydropimaric acid is 85 to 100 weight %.

3. The antifouling coating composition of claim 1, wherein a weight ratio defined by the triorganosilyl ester-containing copolymer (A)/the modified rosin salt (B) is 85/15 to 20/80.

4. The antifouling coating composition of claim 1, wherein a weight ratio defined by the triorganosilyl ester-containing copolymer (A)/the modified rosin salt (B) is 70/30 to 40/60.

5. A method of antifouling treatment comprising the step of forming an antifouling coating film on the surface of an object to be coated using the antifouling coating composition of claims 1.

6. An antifouling coating film formed using the antifouling coating composition of claim 1.

7. A coated object having the antifouling coating film of claim 6 on the surface thereof.

* * * * *